April 26, 1966     R. D. NOLAN     3,248,057
AUTOMOTIVE RADIATOR THERMOSTAT FLAPPER TYPE VALVE
Filed Dec. 21, 1964     4 Sheets-Sheet 1
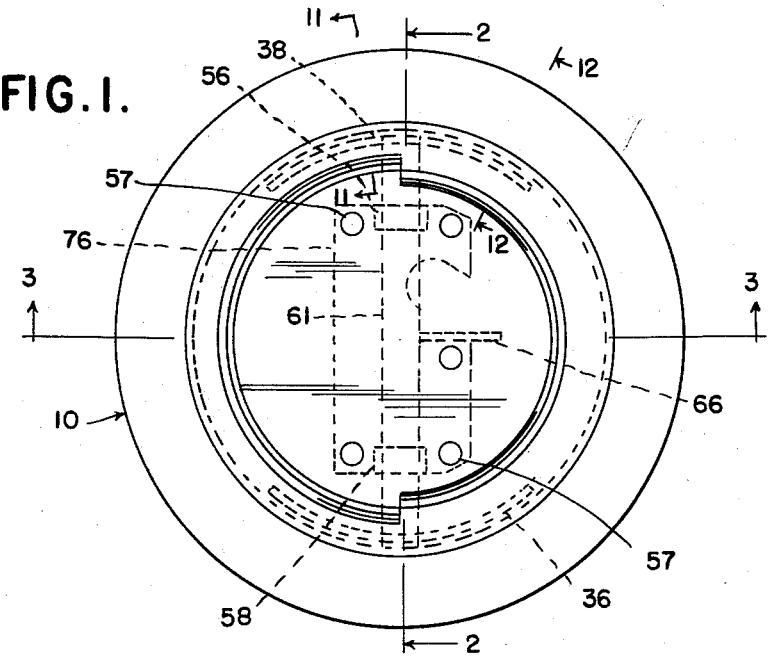
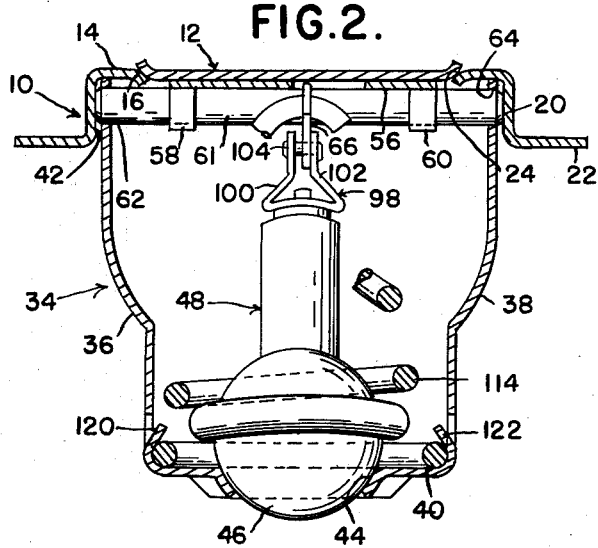
INVENTOR.
RICHARD D. NOLAN
BY
ATTORNEYS April 26, 1966  R. D. NOLAN  3,248,057
AUTOMOTIVE RADIATOR THERMOSTAT FLAPPER TYPE VALVE
Filed Dec. 21, 1964  4 Sheets-Sheet 2
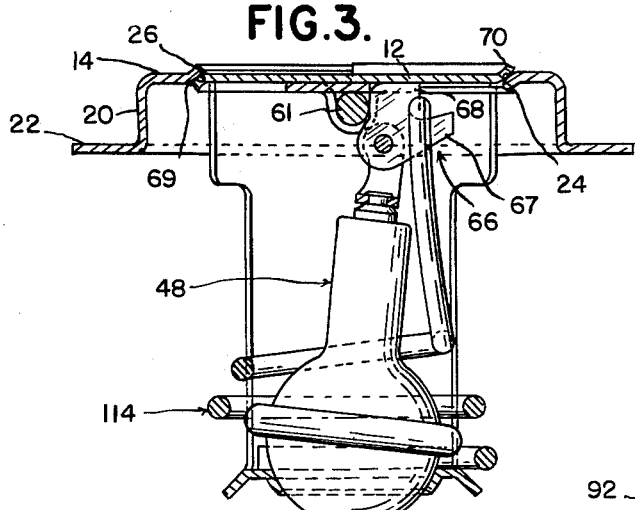
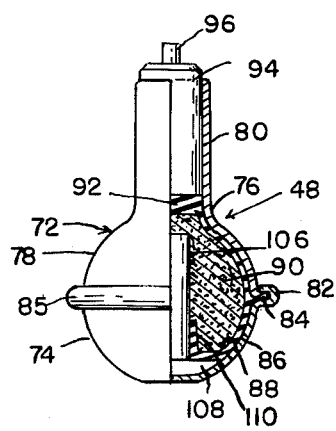
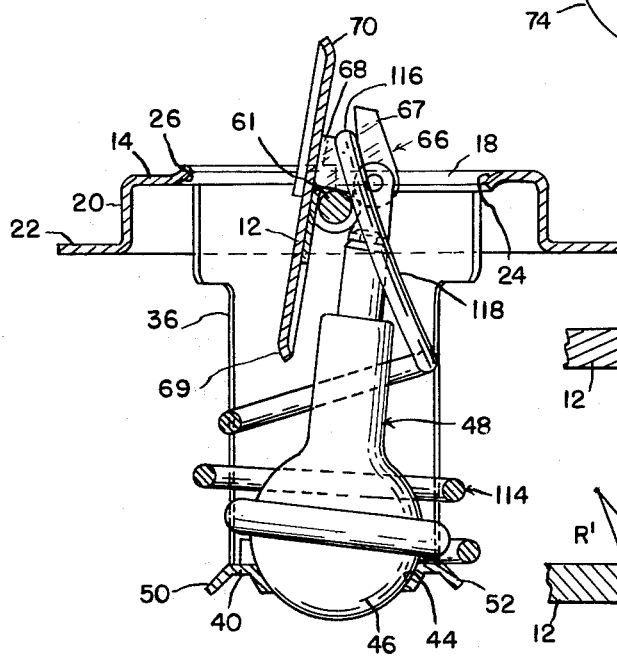
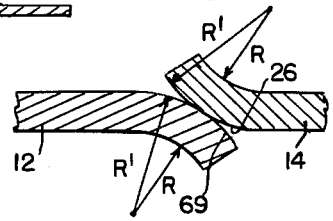
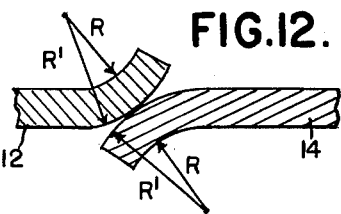
INVENTOR.
RICHARD D. NOLAN April 26, 1966   R. D. NOLAN   3,248,057
AUTOMOTIVE RADIATOR THERMOSTAT FLAPPER TYPE VALVE
Filed Dec. 21, 1964   4 Sheets-Sheet 3

INVENTOR.
RICHARD D. NOLAN
BY
Whittemore, Hulbert
& Belknap ATTORNEYS

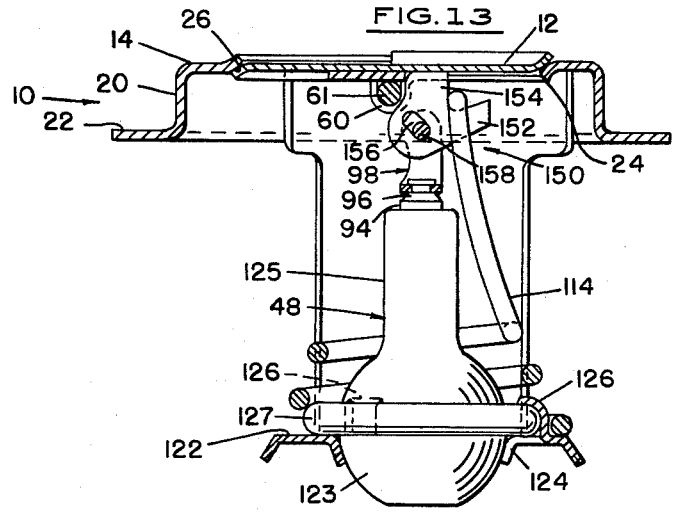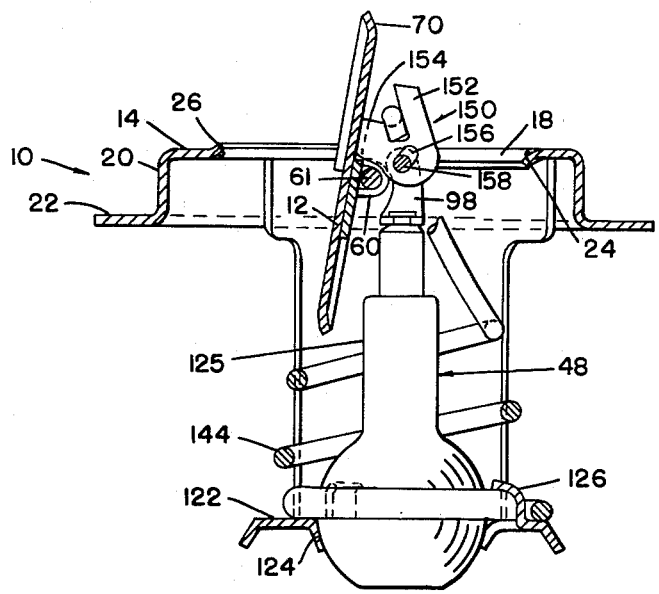

United States Patent Office 3,248,057
Patented Apr. 26, 1966

3,248,057
AUTOMOTIVE RADIATOR THERMOSTAT
FLAPPER TYPE VALVE
Richard D. Nolan, Birmingham, Mich., assignor to Advance Stamping Company, Detroit, Mich., a corporation of Michigan
Filed Dec. 21, 1964, Ser. No. 423,627
12 Claims. (Cl. 236—34)

This invention relates to improvements in thermostatically operated valves which are particularly adapted for use in automobile cooling systems and is a continuation-in-part application of my copending now abandoned application entitled "Automotive Radiator Thermostat Flapper Type Valve," U.S. 194,464, filed May 14, 1962.

It is an object of the present invention to provide a flapper type thermostatically operated valve assembly in which the thermo-actuator thereof is mounted in a ball socket to provide freedom of movement to a maximum of 30° in any direction about the axis of the assembly.

Another object of the present invention is to provide a flapper type of thermostatically operated valve which employs more effective sealing engagement between the edges of the flapper valve and valve opening wherein the flapper valve is provided with a formed radius about its periphery which is adapted to seat on a valve seat having a like radius formed about the periphery of the opening so as to meet each other and form line contact at the tangent points where the radii meet in order to minimize the possibility of foreign matter becoming trapped under the seating area and hindering complete closure of the flapper valve.

Still another object of the present invention is to provide a thermostatic valve assembly of the aforementioned type in which the flapper valve is resiliently urged into tight sealing engagement with the valve seat.

A further object of the present invention is to provide a thermostatically operated valve of the aforementioned type wherein the flapper valve is mounted on an elongated shaft or is provided with a shaftless type connection on the valve housing.

A still further object of the present invention is to provide a thermostatic valve comprising a housing having an opening to be controlled, a flapper valve pivotally mounted in the opening by the housing, a pair of oppositely turned seats around the periphery of the opening, said seats having a transverse arcuate cross-section throughout their extent, a pair of oppositely turned seating flanges around the periphery of the flapper valve, said flanges having a transverse arcuate cross-section throughout their extent, said flapper valve being mounted in the housing with the seating flanges opposite said seats and arranged to have line contact with the seats at the points of tangency when the flapper valve is in a closed position to minimize the possibility of foreign matter becoming trapped under the seating area, and temperature responsive means for operating the flapper valve.

Another object of the present invention is to provide a thermostatic valve of the aforementioned type wherein each of the seats and the flanges extend approximately 180°.

Still another object of the present invention is to provide a thermostatic valve of the aforementioned type wherein the seating areas of said seats and said flanges are formed on the same radius.

A further object of the persent invention is to provide a thermostatic valve of the aforementioned type wherein the temperature responsive actuating means includes a thermo-actuator having a ball shaped end which is received in a spherical socket in the valve housing to provide freedom of action in any direction about the axis of the assembly.

A still further object of the present invention is to provide a thermostatic valve of the aforementioned type which can be fabricated economically from stainless steel or other suitable metals and which lends itself to welding thereby eliminating stapling of the component parts or the like.

It is thus another object of this invention to provide a simplified low cost structure of the aforementioned type having certain advantages contributing to efficiency, reliability, and long life, as well as ease of maintenance.

Further objects and advantages of the present invention will be apparent from the following description, reference being had to the accompanying drawings wherein a preferred form of the present invention is clearly shown.

FIGURE 1 is a top plan view of the thermostatic valve assembly of the present invention.

FIGURE 2 is a vertical sectional view taken substantially on the line 2—2 of FIGURE 1.

FIGURE 3 is a vertical sectional view taken substantially on the line 3—3 of FIGURE 1 and showing the flapper valve in a closed position.

FIGURE 4 is a vertical sectional view taken substantially on the line 3—3 of FIGURE 1 and illustrating the flapper valve in an open position.

FIGURE 4A is a vertical elevation, partly in section, of a novel thermo-actuator.

FIGURE 11 is a sectional view taken on the line 11—11 of FIGURE 1.

FIGURE 12 is a sectional view taken on the line 12—12 of FIGURE 1.

FIGURE 13 is a vertical sectional view of a thermostatic valve assembly which incorporates features of the embodiment illustrated in FIGURES 5 and 6, with the flapper valve shown in a closed position.

FIGURE 14 is a vertical sectional view similar to FIGURE 13 but illustrating the flapper valve in an open position.

Figure 5:
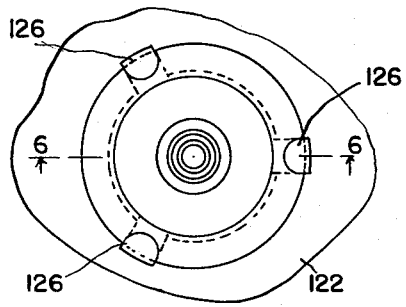
FIGURE 5 is a top plan view of the thermo-actuator assembly illustrated in FIGURE 6.
Figure 7:
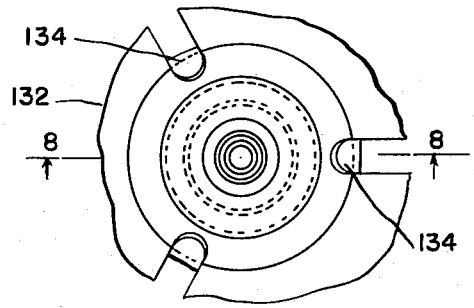
FIGURE 7 is a top plan view of the thermo-actuator assembly illustrated in FIGURE 8.

Referring now to FIGURES 1–4 of the drawings, an annular valve casing 10 is illustrated. The valve casing 10 may be attached in any suitable manner to a hose connection or water jacket structure of an internal combustion engine, through which cooling fluid is flowing, to control the temperature and flow of the cooling fluid by a flapper valve indicated generally by the reference numeral 12.

The annular valve casing 10 and flapper valve 12 may be made from metallic stampings stamped from a sheet or plate of any suitable material, such as stainless steel, thus lending themselves to large scale economical production. The casing 10 is provided with a substantially flat upper annular portion 14. The inner marginal edge 16 of the annular portion 14 defines a valve opening 18 for the flapper valve 12. The novel construction of the marginal edge 16 and peripheral edge of the flapper valve 12 will be described in more detail later. The valve casing 10 includes an annular or circular upright wall portion 20 and a lower outwardly projecting annular or circular flange portion 22 which may seat against an end of a conduit or wall structure of the cooling system of an internal combustion engine, not shown.

The valve opening 18 is of generally circular form. The wall or marginal edge 16 surrounding the opening 18 is provided with a pair of oppositely turned seats 24 and 26, each having a transverse arcuate cross-section. The seats 24 and 26 are diametrically opposite each other and each extend 180°.

The housing 10 includes a cage 34 which is of generally U-shaped formation and is provided with parallel spaced side walls 36 and 38 extending upwardly from opposite sides of a connecting member or bridge 40. The upper edges of the side walls 36 and 38 are received within and appropriately secured to the circular wall 20 provided on the valve casing 10 such as by welding as indicated at 42. The cage 34 may be made from suitable metals such as stainless steel and formed according to well-known metal forming operations.

The bridge member 40 has a central aperture which defines a downwardly extending spherical socket 44 for the lower ball shaped portion 46 of the temperature responsive element or thermo-actuator 48. The outer edges of the bridge member 40 are provided with downwardly turned flanges 50 and 52.

The under side of the flapper valve 12 is provided with a shaft support 56 which is connected to the flapper valve 12 by rivets 57 or the like. The shaft support 56 includes a pair of axially spaced loops 58 and 60 through which the rotatable shaft 61 for the flapper valve 12 extends. The opposite ends of the shaft 61 are received in openings 62 and 64 provided in the walls 36 and 38 respectively. The openings 62 and 64 provide bearing surfaces for supporting the shaft 61 for rotation. The shaft support 56 includes an integral downwardly extending L-shaped spring support 66. The spring support 66 is located in a vertical plane containing the axis of the assembly and at one side of the shaft 61. The spring support 66 includes arms 67 and 68 which define an abutment for a biasing spring to be subsequently described.

The outer periphery of the flapper valve 12 is provided with a pair of oppositely turned arcuate seating flanges 69 and 70 which are formed on the same radius. The seating flanges 69 and 70 are adapted to engage the seats 24 and 26 around the valve opening 18 when the flapper valve 12 is in the closed position illustrated in FIGURES 2 and 3. The flanges 69 and 70 have a transverse arcuate cross-section and are located diametrically opposite one another. The flanges 69 and 70 each extend 180°.

It should be observed when referring to FIGURES 11 and 12 that the arcuate seats 24 and 26 are formed on radiuses R and R'. The corresponding surfaces on the seating flanges 69 and 70 are also formed on radiuses R and R'. With such a construction the seating flanges 69 and 70 contact the seats 24 and 26 in line contact at the points of tangency.

The temperature responsive thermo-actuator 48, as best illustrated in FIGURE 4A, is provided with an outer casing 72 which includes a substantially spherically shaped lower housing 74 which defines one side of a cavity and an upper housing 76. The upper housing 76 includes a substantially spherical shaped portion 78 which forms the other side of the cavity and an integral tubular stem 80. The lower housing 74 is provided on the upper edge thereof with an outwardly extending, inwardly turned U-shaped flange 82 which is adapted to receive the outwardly extending flange 84 provided on the lower edge of the upper housing 76. The arms of the flange 82 are pressed together after the assembly of the housing parts to hold the parts together as illustrated. With such a construction the flanges 82 and 84 form an annular rim 85. The spherically shaped lower housing 74 of the housing 72 is received in the spherical socket 44 to provide freedom of action for the thermo-actuator 48 to a maximum of 30° with respect to the axis of the assembly.

The cavity in the housing 72 is designed to accommodate therein a capsule 86. The capsule 86 may be molded or otherwise formed from any suitable resilient material, such as rubber or the like and is provided with an internal cavity 88 which may be filled with any suitable type of heat expansive material 90. The heat expansive material may be of any of those heretofore used for this purpose, or any other compound which is suited or adapted to this type of application and characterized by rapid volume change over a narrow temperature range. Also mounted in the housing 72 in the lower end of the stem 80 is a resilient insert 92 which is integral with the capsule 86. The insert 92 may be considered as a piston. The insert 92 has an end surface in contact with a piston rod 94. The piston rod 94 is mounted for straight line reciprocation within the tubular stem 80. When the critical temperature is reached, the material 90 within the capsule 86 undergoes rapid expansion so as to expand the capsule 86 and move the insert 92 and piston rod 94 outwardly.

The piston 94 is provided with a stub shaft 96. A bracket or clevis 98 is appropriately carried by the stub shaft 96 and has a pair of spaced side walls 100 and 102 as best illustrated in FIGURE 2. The side walls 100 and 102 are appropriately connected to the spring support 66 by means of a rivet 104. It should be understood that in certain applications the clevis 98 is eliminated, with the piston 94 being provided with a vertically extending slot which receives the spring support 66. In such a case a transversely extending pivot pin connects the support 66 to the piston 94.

With such a construction it is necessary that a rapid transfer of heat be effected from the exterior surface of the thermo-actuator 48 to the heat expansible material 90 contained within the capsule 86. The best results are obtained by making the parts of the housing 72 from material having good heat conductive properties, such as brass, copper, aluminum, etc. The capsule 86 is provided with a heat transfer pin 106 which is also formed of a material which is also a good conductor of heat. The pin 106 is provided with a head 108 which is adapted to abut against the wall of the housing 72 as illustrated in FIGURE 4A to provide intimate contact between the head 108 and the housing 72 over the entire area of the head 108.

The shank of the pin 106 is preferably formed with a slight taper whereby the pin increases in diameter as the bottom end of the pin remote from the head 108 is approached. This construction assists in the sealing of the pin 106 within the capsule 86 which is effected by a lip 110 formed integrally with the wall of the capsule 86 and projecting inwardly toward the center thereof. The lip 110 is tubular in form and when in its free state prior to assembly of the pin 106 therewith is somewhat smaller in diameter than the pin 106. During the assembly the lip 110 is stretched when the pin 106 is inserted or pushed into place with the bottom end thereof situated within the cavity 88 formed within the capsule 86.

The lip 110 will, upon expansion of the material 90, be pressed tightly against the shank of the heat transfer pin 106 and provide a seal which becomes more positive as the internal pressure is increased within the cavity 88 so that the material 90 will be effectively prevented from escaping from the capsule 86 despite the extremely high pressures developed within the cavity 88.

The exterior surface of the capsule 86 may be coated with a suitable lubricant before the thermoactuator 48 is assembled so as to facilitate movement of the capsule 86 within the casing 72.

The bridge 40 also forms a seat for a coil spring 114. The coil spring 114 consists of a relatively few convolutions, converging in diameter from the lower to the upper end thereof. The spring 114 has an integral upper hook portion 116 extending substantially at a right angle to the arm extension 118 of the spring 114. The hook portion 116 reacts against the spring support 66 and in particular against arm 67 at a point offset laterally from the pivotal axis of the flapper valve 12 and is effective to maintain the flapper valve 12 closed except when opened by the thermo-actuator 48.

The spring 114 is held in a predetermined position against the seat formed by the bridge 40 by means of a pair of tabs 120 and 122 which are struck out of the walls 36 and 38 respectively as best illustrated in FIGURE 2. Tabs 120 and 122 are bent inwardly toward the axis of the assembly so as to hold the bottom convolution of the spring 114 firmly against the seat provided by the bridge 40.

As mentioned previously, the flapper valve 12 is provided with a formed radius R' about its periphery which is adapted to seat on the valve seat provided around the opening 18. The seats 24 and 26 also are formed of a like radius R'. The flanges therefore have line contact with the seats at the points of tangency as best illustrated in FIGURE 3. With such a construction the possibility of foreign matter or relatively small particles becoming trapped under the seating area and hindering full closure of the flapper valve 12 is minimized.

By making the casing 10 and flapper valve 12 out of a relatively hard metal such as stainless steel rather than from relatively soft metals, it has been found that particles of sand or other dirt particles are not as likely to cling or remain on the valve seats. When the flapper valve 12 is closed, the sand or dirt particles are in effect "squeezed out" or away from the seating area.

In the event that dirt or grit should lodge on the valve seat 24 there is a definite tendency for the flapper valve 12 provided with the curved seating flanges 69 and 70 to move in an arc whereby the curved seating flange 70 will wipe or edge the small particles off from the curved or arcuate seat 24. The aforesaid wiping action tends to minimize the possibility of dirt being lodged between the curved seat 24 and the curved flange 70 of the flapper valve 12. Once the flapper valve 12 is seated as illustrated in FIGURE 3 there is no tendency for further wiping movement.

FIGURES 5–10 illustrate various ways of mounting the thermo-actuator 48. The ball socket mountings are designed to meet different applications and conditions.

Figure 6:
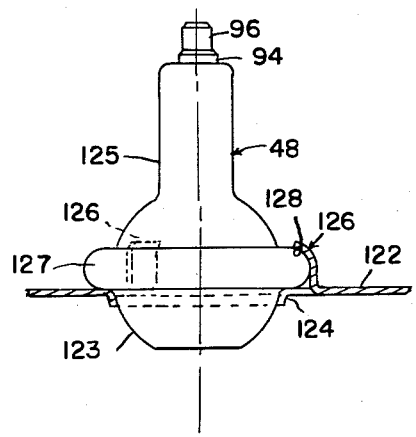
FIGURE 6 is an elevational view, partly in section, of one embodiment of the ball socket mounting for a thermo-actuator, taken along the line 6—6 of FIGURE 5, and illustrating the actuator in a fixed position.

As an example, FIGURES 5 and 6 illustrate a bridge 122, similar to the bridge 34 illustrated in FIGURES 2–4, in the lower plate of the cage. The bridge 122 is provided with a downwardly turned annular, substantially spherical, socket 124. The thermo-actuator 48 is mounted in the socket 124 such that the lower spherical portion 123 of the casing 125 is received within the socket 124. The annular rim 127 provided on the casing 125 is held against the bridge 122 by means of a plurality of retaining tabs 126 which are struck out of the plane of the bridge 122 and bent upwardly and then inwardly as indicated by numeral 128 so as to conform to the curvature of the rim 127 thereby effectively holding the rim 127 against the bridge 122 and preventing the casing 125 of the actuator 48 from moving. With such a construction it is obvious that the thermo-actuator 48 is mounted in a fixed position and does not rotate with respect to the socket 124.

FIGURES 13 and 14 illustrate the actuator and retaining tabs 126 of FIGURES 5 and 6 incorporated in the valve casing 10 of FIGURES 2–4 inclusive. Where applicable, the same numerical designation will be utilized to represent identical parts.

Specifically the flapper valve 12 is provided with an integral downwardly extending L-shaped spring support 150 which is located in a vertical plane containing the axis of the assembly and at one side of the shaft 61. The spring support 150 includes arms 152 and 154 which define an abutment for the biasing spring 114 previously described. The bracket 98 previously described is carried by the stub shaft 96 of piston 94 and includes a pair of spaced side walls 100 and 102 (FIGURE 2) to which the spring support 150 is connected.

In order to permit the flapper valve 12 to open and close while at the same time restraining actuator 48 from rotating by means of retaining tabs 126, the aforesaid spring support 150 is provided with an elongated groove 156. A rivet or pin 158 extends through and is movable in groove 156 and has the opposite ends thereof carried by the side walls 100 and 102 of bracket 98. Thus, when the actuator 48 is energized or de-energized the piston 94 moves in a direction urging the pin 158 against a wall of the groove 156 to effect rotation of the flapper valve 12 to an opened or closed position.

Figure 8:
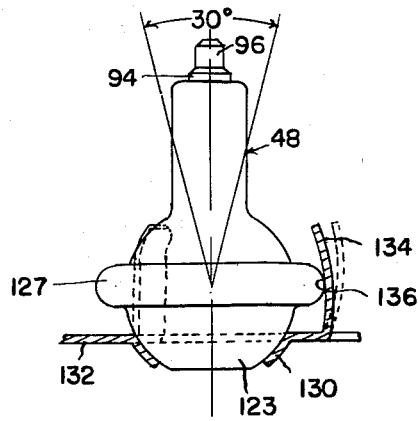
FIGURE 8 is an elevational view, partly in section, of another embodiment of a ball socket mounting for a thermo-actuator, taken along the line 8—8 of FIGURE 7 and illustrating the actuator mounted for movement about the vertical axis thereof.

FIGURE 8 shows a thermo-actuator 48 having the lower spherical portion 123 received in a spherical socket 130 provided in the bridge 132 of the cage. The rim 127 is spaced vertically from the bridge 132 so as to permit the actuator to rotate in the socket 130. A plurality of retaining tabs 134 are struck out of the bridge 132. The tabs 134 have intermediate portions 136 in contact with the annular rim 127. With such an arrangement the actuator 48 is mounted for rocking movement with respect to the spherical socket 130 such that the actuator can move either to the left or to the right of the vertical center line of the assembly for a total angular movement of approximately 30°. The amount of movement of the thermo-actuator 48 is limited by the engagement of the annular rim 127 with the tabs 134 and the bridge 132.

Figure 10:
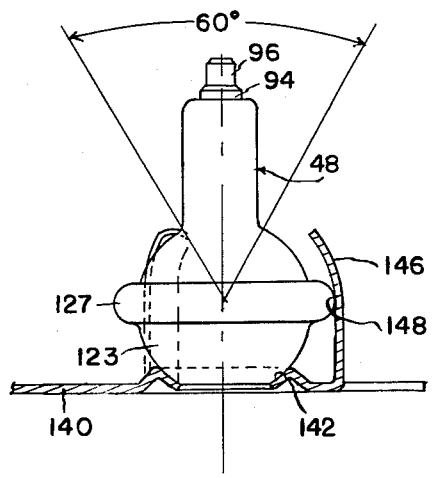
FIGURE 10 is an elevational view, partly in section of still another embodiment of a ball socket mounting for a thermo-actuator taken along the line 10—10 of FIGURE 9 and illustrating the actuator mounted for movement about the vertical axis thereof.
Figure 9:
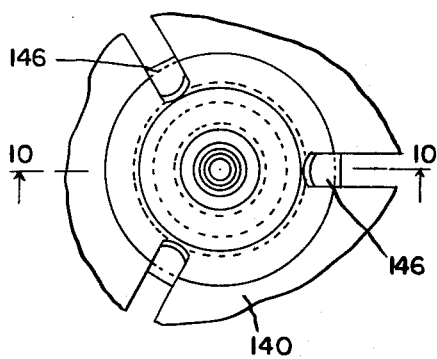
FIGURE 9 is a top plan view of the thermo-actuator assembly illustrated in FIGURE 10.

FIGURE 10 illustrates another ball socket mounting wherein the bridge 140 is provided with an upwardly facing annular spherical socket 142. The annular rim 127 of the thermo-actuator 48 is spaced vertically from the bridge 140 a greater distance than the rim 127 in FIGURE 8. A plurality of retaining tabs 146 are provided and include intermediate portions 148 which contact the annular rim 127 as illustrated. The thermo-actuator 48 is designed to move approximately 30° either to the left or right of the vertical center line of the assembly for a total angular movement of approximately 60°. The amount of movement of the thermo-actuator 48 is limited by the engagement of the annular rim 127 with the tabs 146 and the bridge 140.

The drawings and the foregoing specification constitute a description of the improved automotive radiator thermostat flapper type valve in such full, clear, concise and exact terms as to enable any person skilled in the art to practice the invention, the scope of which is indicated by the appended claims.

What I claim as my invention is:

1. A thermostatic valve comprising a housing having an opening to be controlled which is surrounded by an annular valve seat, a flapper valve pivotally mounted in said opening by said housing, one portion of said annular valve seat extending inwardly and downwardly and the opposite portion thereof extending inwardly and upwardly, said flapper valve having a marginal edge seating flange engageable with said valve seat, one portion of said seating flange extending outwardly and upwardly for engagement with said one portion of said valve seat and the opposite portion of the seating flange extending outwardly and downwardly for engagement with said opposite portion of said valve seat, the portions of said seat and said flange having a transverse arcuate cross-section throughout their extent, said flapper valve being mounted in said housing with said seating flange opposite said seat and arranged to have line contact with said seat at the points of tangency when said flapper valve is closed, and temperature responsive actuating means for operating said flapper valve.

2. The thermostatic valve defined in claim 1 wherein each of said portions of said seat and said flange extends approximately 180°.

3. The thermostatic valve defined in claim 1 wherein the seating areas of said seat and said flange are formed on substantially the same radius.

4. The thermostatic valve defined in claim 1 wherein spring means is provided for biasing said flapper valve towards said valve seat.

5. A thermostatic valve comprising a housing having an upper plate and a lower plate, concentrically arranged openings in said plates, the edge of the opening in said lower plate extending inwardly and downwardly and defining a spherically shaped socket, a flapper valve in the opening in the upper plate, a thermostatically controlled actuator having a spherically shaped casing which is received in said spherically shaped socket, said actuator including a piston movable in response to temperature variations, a pivotal driving connection between said movable piston and said flapper valve to angularly position said flapper valve in the opening in said upper plate in response to changes in temperature, and a coiled control spring in said housing surrounding said actuator and arranged to bias said driving connection to thereby urge said flapper valve in a closing direction.

6. The thermostatic valve defined in claim 5 wherein said actuator is mounted for rocking movement in said socket, the amount of rocking movement being limited by retaining tabs struck out of said lower plate and engageable with said actuator.

7. A thermostatic valve comprising a housing having an upper plate and a lower plate which are spaced apart, concentrically arranged openings in said plates, the opening in said upper plate being surrounded by an annular valve seat, a flapper valve pivotally mounted in the opening in said upper plate, one portion of said annular valve seat extending inwardly and downwardly and the opposite portion thereof extending inwardly and upwardly, said flapper valve having a marginal edge seating flange engageable with said valve seat, one portion of said marginal flange extending outwardly and upwardly for engagement with said one portion of said valve seat and the opposite portion of the marginal flange extending outwardly and downwardly for engagement with said opposite portion of said valve seat, the portions of said seat and said flange having a transverse arcuate cross-section throughout their extent formed on substantially the same radius, each of said portions of said seat and flange having an angular extent of approximately 180°, the edge of the opening in said lower plate curving inwardly and defining a spherically shaped socket, an elongated thermostatically controlled actuator having a spherically shaped casing which is received in said spherically shaped socket, said actuator including a piston movable axially in response to temperature variations, a pivotal driving connection between said movable piston on said flapper valve to angularly position said flapper valve in the opening in said upper plate in response to changes in temperature, and a coiled control spring in said housing surrounding said actuator and arranged to bias said driving connection to thereby urge said flapper valve in a closing direction, said actuator being mounted in said socket for rocking movement during changes in temperature.

8. The thermostatic valve defined in claim 7 wherein the amount of rocking movement of said actuator is limited by retaining tabs struck out of said lower plate and engageable with said actuator.

9. A thermostatic valve comprising a housing having an upper plate and a lower plate, concentrically arranged openings in said plates, the edge of the opening in said lower plate extending inwardly and downwardly and defining a spherically shaped socket, a flapper valve in the opening in the upper plate, a thermostatically controlled actuator having a casing which is provided with a lower portion having a spherical part which is received in said spherically shaped socket, said actuator including a piston movable axially and response to temperature variations, a pivotal driving connection between said piston and said flapper valve to angularly position said flapper valve in the opening in said upper plate in response to changes in temperature, a plurality of retaining tabs struck out of said lower plate and engaging said casing to prevent movement thereof, and a coiled control spring in said housing surrounding the casing of said actuator and arranged to bias said driving connection to thereby urge said flapper valve in a closing direction.

10. The thermostatic valve defined in claim 9 wherein said casing is provided with an outwardly extending annular rim of arcuate cross-section immediately above the lower portion thereof, the portions of said retaining tabs engaging and holding said rim against said bottom plate.

11. A thermostatic valve comprising a housing having an upper plate and a lower plate provided with openings, a flapper valve in the opening in the upper plate, a thermostatically controlled actuator having a casing which is received in the opening in and is carried by said lower plate, said actuator including a piston movable in and out of said casing in response to temperature variations, a pivotal driving connection between said movable piston and said flapper valve to angularly position said flapper valve in the opening in said upper plate in response to changes in temperatures, a plurality of retaining tabs struck out of said lower plate and engaging said casing to prevent movement thereof, and a coiled control spring in said housing surrounding the casing of said actuator and arranged to bias said driving connection to thereby urge said flapper valve in a closing direction.

12. A thermostatic valve defined in claim 11 wherein said casing is provided with an outwardly extending annular rim of arcuate cross-section, said retaining tabs engaging and holding said rim against said bottom plate.

References Cited by the Examiner
UNITED STATES PATENTS

| | | | |
|---|---|---|---|
| 1,302,891 | 5/1919 | Balthasar | 251—305 |
| 1,607,745 | 11/1926 | Palm | 236—34 |
| 2,710,146 | 6/1955 | Drapeau | 236—34 |
| 2,736,604 | 2/1956 | Albright | 73—358 |
| 2,742,051 | 4/1956 | Chanda | 236—34 |
| 2,765,984 | 10/1956 | Puster | 236—34 |
| 2,786,633 | 3/1957 | Mayo | 236—34 |
| 2,873,070 | 2/1959 | Drapeau | 236—34 |

EDWARD J. MICHAEL, *Primary Examiner.*